United States Patent
Petersen et al.

(10) Patent No.: US 8,777,796 B2
(45) Date of Patent: Jul. 15, 2014

(54) TRANSMISSION AND DIFFERENTIAL GEARING AS WELL AS MOTOR AND GEARING UNIT

(71) Applicants: Rainer Petersen, Wolfsburg (DE); Andreas Lutz, Braunschweig (DE); Jörg Möckel, Sassenborg (DE); Stefan Hanke, Braunschweig (DE)

(72) Inventors: Rainer Petersen, Wolfsburg (DE); Andreas Lutz, Braunschweig (DE); Jörg Möckel, Sassenborg (DE); Stefan Hanke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/910,655

(22) Filed: Jun. 5, 2013

(65) Prior Publication Data

US 2013/0267368 A1    Oct. 10, 2013

Related U.S. Application Data

(63) Continuation of application No. PCT/EP2011/006308, filed on Dec. 14, 2011.

(30) Foreign Application Priority Data

Dec. 15, 2010    (DE) .......................... 10 2010 054 533

(51) Int. Cl.
*F16H 3/44*    (2006.01)

(52) U.S. Cl.
USPC ......................................................... 475/269

(58) Field of Classification Search
USPC .................... 475/282, 280, 288, 330, 269
See application file for complete search history.

(56) References Cited

U.S. PATENT DOCUMENTS 5,457,363 A * 10/1995 Yoshii et al. .................. 318/432
6,955,627 B2 * 10/2005 Thomas et al. ............... 475/283

(Continued)

FOREIGN PATENT DOCUMENTS

DE    2235469 A1    1/1974
DE    4027724 A1    4/1991

(Continued)

OTHER PUBLICATIONS

Search Report issued by the German Patent and Trademark Office for German Patent Application No. DE 10 2010 054 533.3, dated Jun. 15, 2011.

(Continued)

*Primary Examiner* — David D Le
*Assistant Examiner* — David J Hlavka
(74) *Attorney, Agent, or Firm* — Manfred Beck, P.A.

(57) ABSTRACT

A transmission and differential gearing includes a transmission section and a differential section. The transmission section has an input stage and a load stage. The sun gear of the input stage is connected or coupleable to an input shaft. The ring gear of the bad stage is fixed relative to the housing. The sun gear of the bad stage is connected to the carrier of the input stage. The carrier of the load stage is connected to the ring gear of the input stage. The differential section is a spur gear differential configured as a planetary gear set. The ring gear of the planetary gear set is connected to the carrier of the load stage. The carrier of the planetary gear set and the sun gear of the planetary gear set are connected to a respective one of two output shafts. A motor and gearing unit is also provided.

16 Claims, 1 Drawing Sheet

(56) References Cited

U.S. PATENT DOCUMENTS

| | | | |
|---|---|---|---|
| 8,272,989 B2 * | 9/2012 | Baasch et al. | 475/150 |
| 8,490,770 B2 * | 7/2013 | Schwekutsch et al. | 192/219.5 |
| 2007/0021264 A1 | 1/2007 | Honda et al. | |
| 2008/0064552 A1 | 3/2008 | Tangl | |

FOREIGN PATENT DOCUMENTS

| | | |
|---|---|---|
| DE | 102006030214 A1 | 1/2007 |
| DE | 102006040144 A1 | 2/2008 |
| DE | 102008029282 A1 | 12/2009 |
| DE | 102009014476 A1 | 9/2010 |
| WO | 2010051951 A2 | 5/2010 |

OTHER PUBLICATIONS

International Search Report for International Application No. PCT/EP2011/006308, completed Apr. 19, 2012.

International Preliminary Report on Patentability for International Application No. PCT/EP2011/006308, including Written Opinion of the International Searching Authority and translation thereof, dated Jun. 18, 2013.

* cited by examiner

TRANSMISSION AND DIFFERENTIAL GEARING AS WELL AS MOTOR AND GEARING UNIT

CROSS-REFERENCE TO RELATED APPLICATIONS

This application is a continuation, under 35 U.S.C. §120, of copending International Application No. PCT/EP2011/006308, filed Dec. 14, 2011, which designated the United States; this application also claims the priority, under 35 U.S.C. §119, of German Patent Application No. DE 10 2010 054 533.3, filed Dec. 15, 2010; the prior applications are herewith incorporated by reference in their entirety.

BACKGROUND OF THE INVENTION

Field of the Invention

The invention relates to a transmission and differential gearing with an input shaft and two output shafts which are disposed coaxially with respect to the input shaft, wherein the transmission and differential gearing has a housing, in which are disposed a transmission section including at least one planetary stage and a differential section configured as a spur gear differential.

The invention furthermore relates to a motor and gearing unit including an electric motor and a transmission and differential gearing of the aforementioned type which is mounted to the electric motor.

Usual types of gearings in electric vehicles are based on conventional designs of gearings that are configured to be coupled to internal combustion engines. With regard to the construction, a distinct separation between the functionalities "transmission gearing" and "differential gearing" (differential) is in this case implemented. Typically, the motor output shaft of the electric motor is parallel to the driven axle. The motor output shaft is in this case connected to the input shaft of a transmission gearing or can for example be coupled through the use of a clutch. The output shaft of the transmission gearing has a parallel axial offset with respect to the input shaft and drives the differential cage of a differential gearing that is structurally separate and whose two output shafts are connected to the power take-off wheels of the driven axle and distribute, as axle flange shafts, the torque to the power take-off wheels of the driven axle. This configuration is extremely unfavorable in terms of the installation space required.

So-called inline gearings which can be coaxially flange-mounted to the electric motor are more favorable with regard to the required installation space. As is typical for electric motors, the motor output shaft is coaxial with respect to the motor windings. The gearing is flange-mounted to the motor so that the motor output shaft is coaxially connected to the gearing input shaft. The gearing can in this case integrate a transmission section, i.e. a gearing portion that implements the functionality "transmission," and a differential section connected downstream, i.e. a gearing part that implements the functionality "differential," in a housing. Both differential output shafts can in this case be coaxially aligned with respect to one another and with respect to the input shaft as well as the motor output shaft. In this case one of the differential output shafts extends through the gearing input shaft and the motor output shaft, both of which are formed as hollow shafts. An example of this type of construction is the gearing structure of the fuel cell vehicle of the type "HyMotion III" of the company Volkswagen AG. The transmission section of the gearing is in this case configured as a planetary stage with stepped planets, wherein, on the input side, a larger planetary stage is driven by the sun which is connected to the input shaft and a smaller planetary stage on the output side meshes with a ring gear that is fixed relative to the housing. The carrier, which acts as a power take-off of the transmission stage, is directly connected to the carrier of a spur gear differential of the type with two suns as wheel drives. This gearing structure has various disadvantages. First of all, there can be an undesired generation of noise due to the required very large gearing tolerances, secondly, the positioning of the stepped planets during the assembly is problematic and, thirdly, due to the installation space it is not possible to easily integrate a parking lock.

SUMMARY OF THE INVENTION

It is accordingly an object of the invention to provide a transmission and differential gearing which overcomes the above-mentioned disadvantages of the heretofore-known transmission and differential gearings of this general type and which has no additional disadvantages with respect to the installation space associated therewith. Another object of the invention is to provide a correspondingly improved motor and gearing unit.

With the foregoing and other objects in view there is provided, in accordance with the invention, a transmission and differential gearing which includes:
 a housing;
 an input shaft;
 two output shafts disposed coaxially to the input shaft;
 a transmission section having two planetary stages, namely an input stage and a load stage, the input stage having a carrier, a ring gear and a sun gear, the sun gear of the input stage being connected or coupleable to the input shaft, the load stage having a carrier, a ring gear and a sun gear, the ring gear of the load stage being fixed relative to the housing, the sun gear of the load stage being connected to the carrier of the input stage, the carrier of the load stage being connected to the ring gear of the input stage; and
 a differential section configured as a spur gear differential, the spur gear differential being configured as a planetary gear set having a positive stationary gear ratio and having a carrier, a ring gear and a sun gear, the ring gear of the planetary gear set being connected to the carrier of the load stage, the carrier of the planetary gear set and the sun gear of the planetary gear set being connected to a respective one of the two output shafts.

In other words, according to the invention, there is provided a transmission and differential gearing with an input shaft and two output shafts disposed coaxial to the input shaft, including a housing, in which a transmission section including at least one planetary stage and a differential section configured as spur gear differential are disposed, wherein the transmission section has two planetary stages, namely an input stage whose sun gear is connected to or can be coupled to the input shaft, and a load stage with a ring gear fixed relative to the housing wherein the sun gear of the load stage is connected to the carrier of the input stage and wherein the carrier of the load stage is connected to the ring gear of the input stage, and wherein the spur gear differential is configured as a planetary gear set with a positive stationary gear ratio whose ring gear is connected to the carrier of the load stage and whose carrier and sun gear are connected to a respective one of the output shafts.

According to another feature of the invention, the input shaft is configured as a hollow shaft; and one of the two output shafts extends coaxially through the input shaft.

According to yet another feature of the invention, there is provided a through-going coupling shaft mounted on both sides of an entirety of the transmission section and the differential section at the housing, the through-going coupling shaft carrying the ring gear of the input stage, the carrier of the load stage and the ring gear of the spur gear differential.

According to another feature of the invention, the through-going coupling shaft has a bearing on a side of the input stage; an extension shaft extends beyond the bearing; and the carrier of the input stage is connected to the extension shaft.

According to a further feature of the invention, there is provided a parking lock device disposed in the housing; a parking lock spur gear in engagement with the parking lock device; and the carrier of the input stage being connected to the parking lock spur gear.

According to another feature of the invention, there is provided a parking lock device disposed in the housing; a parking lock spur gear disposed at a portion of the extension shaft, the portion of the extension shaft extending beyond the bearing of the through-going coupling shaft; and the parking lock spur gear being in engagement with the parking lock device.

According to a further feature of the invention, there is provided a clutch device, the clutch device coupling, in a first clutch position, the sun gear of the input stage to the input shaft, the clutch device coupling, in a second clutch position, the carrier of the input stage to the input shaft and the clutch device, in a third clutch position, completely decoupling the input stage.

According to another feature of the invention, there is provided a clutch device, the clutch device coupling, in a first clutch position, the sun gear of the input stage to the input shaft, the clutch device coupling, in a second clutch position, the carrier of the input stage to the input shaft and the clutch device, in a third clutch position, completely decoupling the input stage; and the clutch device engaging at a portion of the extension shaft, the portion of the extension shaft extending beyond the bearing of the through-going coupling shaft.

According to another feature of the invention, there is provided a clutch device, the clutch device coupling, in a first clutch position, the sun gear of the input stage to the input shaft, the clutch device coupling, in a second clutch position, the carrier of the input stage to the input shaft and the clutch device, in a third clutch position, completely decoupling the input stage; and the clutch device engaging at a portion of the extension shaft, the portion of the extension shaft extending beyond the bearing of the through-going coupling shaft such that the clutch device contacts at a part of the portion of the extension shaft extending beyond the bearing that faces away from the bearing of the coupling shaft.

With the objects of the invention in view there is also provided, a motor and gearing unit which includes:

an electric motor having windings and a motor output shaft;

a transmission and differential gearing including a housing, an input shaft, two output shafts disposed coaxially to the input shaft, a transmission section and a differential section;

the transmission section having two planetary stages, namely an input stage and a load stage, the input stage having a carrier, a ring gear and a sun gear, the sun gear of the input stage being connected or coupleable to the input shaft, the load stage having a carrier, a ring gear and a sun gear, the ring gear of the load stage being fixed relative to the housing, the sun gear of the load stage being connected to the carrier of the input stage, the carrier of the load stage being connected to the ring gear of the input stage;

the differential section being configured as a spur gear differential, the spur gear differential being configured as a planetary gear set having a positive stationary gear ratio and having a carrier, a ring gear and a sun gear, the ring gear of the planetary gear set being connected to the carrier of the load stage, the carrier of the planetary gear set and the sun gear of the planetary gear set being connected to a respective one of the two output shafts; and the transmission and differential gearing being flange-mounted coaxial to the electric motor, the motor output shaft being disposed coaxial to the windings of the electric motor, the motor output shaft being connected to the input shaft of the transmission and differential gearing, the motor output shaft being configured as a hollow shaft and being traversed coaxially by one of the two output shafts of the transmission and differential gearing.

In other words, the above-mentioned second object is achieved by a motor and gearing unit, having an electric motor and having a transmission and differential gearing according to one of the embodiments defined above which is flange-mounted coaxially to the electric motor, wherein a motor output shaft of the electric motor, the motor output shaft being disposed coaxially with respect to the windings of the electric motor, is connected to the input shaft of the gearing and is formed as a hollow shaft which is traversed coaxially by one of the output shafts of the gearing.

The invention includes two essential sets of features. Firstly, the known transmission section, which is implemented with stepped planets, is replaced by two simple planetary stages, which will be referred to according to their function here as an input stage and a load stage. In this case, the sun gear of the input stage is connected to the input shaft, or, as explained below in more detail for an embodiment of the invention, can for example be coupled through the use of a clutch. The use of the sun of the input stage as an input element of the gearing according to the invention is particularly advantageous in view of its coaxial flange connection to the electric motor. The input stage is configured as a full-fledged planetary stage with sun gear, carrier and ring gear, wherein a set of simple planet gears is mounted on the carrier. Such a planetary stage has a negative stationary gear ratio, wherein in particular a stationary gear ratio of −2±10% has been found to be favorable. Directly adjacent to the input stage there is the load stage which is configured as a further full-fledged planetary stage with a simple planet set, wherein the carrier of the input stage is connected to the sun gear of the load stage and the ring gear of the input stage is connected to the carrier of the load stage. The ring gear of the load stage is fixed relative to the housing. A stationary gear ratio of −3±10% has proved to be favorable for the load stage. With such stationary gear ratios it is possible to achieve overall gear ratios in the range of about 8-12, which is favorable for typical electrical axle drives. The main load is in this case taken up by the larger load stage. While a considerably smaller load is put on the smaller input stage. The carrier of the load stage serves as the power take-off of the described transmission section.

The second set of features of the invention relates to the configuration of the differential section, i.e. the differential. Since the transmission section of the gearing according to the invention, takes up more installation space in an axial direction than the transmission section of the prior art, an adoption of the known type of construction of the spur gear differential with two suns is not suitable. The invention provides, therefore, as a differential section, a spur gear differential that is configured as a complete planetary gear set with a positive stationary gear ratio. The input torque, which is delivered by the carrier of the load stage, is introduced via the ring gear of the spur gear differential. Its carrier carries two sets of planets meshing with one another, so that a positive stationary gear ratio, in particular a stationary gear ratio of +2 is implemented. The carrier and sun gear of the differential serve as output elements and are in each case connected to a respective one of the gearing output shafts. In this case one of the gearing output shafts advantageously extends through the input shaft which is embodied as a hollow shaft. Preferably, it is here the output shaft connected to the sun of the spur gear differential.

Preferably, a through-going coupling shaft is mounted on both sides of the entirety of the transmission section and the differential section at the housing, wherein the coupling shaft carries the ring gear of the input stage, the carrier of the load stage and the ring gear of the spur gear differential. The mounting can thus be relocated to outside of the region of the gearing that is tightly packed with rotating elements, which results in a very compact type of construction.

In a further development of the invention it is provided that the carrier of the input stage is connected to an extension shaft, which extends beyond the bearing of the coupling shaft on the side of the input stage. This extension shaft provides an easily accessible and widely usable point of engagement or point of contact for acting on the gearing structure according to the invention. Two of the possible uses are described below.

The carrier of the input stage has proved to be a particularly effective application point for the interaction with a parking lock. In a further embodiment of the invention, it is thus provided that the carrier of the input stage is connected to a parking lock spur gear which is in engagement with a parking lock device disposed in the housing. If the parking lock device blocks the parking lock spur gear, the sun gear of the load stage is held fixed together with the carrier of the input stage. Thus the entire load stage, which has a ring gear that is fixed relative to the housing, is blocked. The load of the parking lock acts in this case on the robust load stage, so that the smaller input stage is not overstressed.

This embodiment of the invention is particularly advantageous when implemented together with the above-mentioned variant with an extension shaft. In this case, the parking lock spur gear is preferably disposed at the portion of the extension shaft that extends beyond the bearing of the coupling shaft. In other words, the contact point, which is brought outside the actual working region of the gearing through the use of the extension shaft, is used for the interaction with the parking lock device. Accordingly, the parking lock device can be accommodated in a housing region that is not used otherwise.

In another embodiment of the invention, a clutch device is provided which couples, in a first clutch position, the sun gear of the input stage to the input shaft, and which couples, in a second clutch position, the carrier of the input stage to the input shaft and, in a third clutch position, completely decouples the input stage. This means that the gearing according to the invention is augmented by the additional clutch device to form a shiftable two-speed gearing. Alternatively the sun gear of the input stage or the carrier of the input stage serve as input element of the gearing according to the invention. Through the use of the clutch device, both are coupleable as an alternative to each other to the input shaft. The gearing acts in this case in the above-mentioned first clutch position as described above. In the aforementioned second clutch position only the load stage acts as a transmission section with a correspondingly shorter gear ratio. In the aforementioned third clutch position a connected electric motor is completely separated from the gearing.

This embodiment according to the invention is also preferably implemented together with the above-explained variant with the extension shaft. Here, too, the extension shaft has an easily accessible point of application or contact point—in this case for the clutch device, which preferably engages at the portion of the extension shaft that extends beyond the bearing of the coupling shaft.

If in addition also the above-mentioned integration of the parking lock is to be implemented, it is advantageous if the clutch device contacts at a part of the projecting portion of the extension shaft that faces away from the bearing of the coupling shaft. In other words, the individual elements are preferably staggered in the following order: Electric motor, clutch device, parking lock, first coupling shaft bearing, input stage, load stage, spur gear differential, second coupling shaft bearing.

Other features which are considered as characteristic for the invention are set forth in the appended claims.

Although the invention is illustrated and described herein as embodied in a transmission and differential gearing as well as a motor and gearing unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
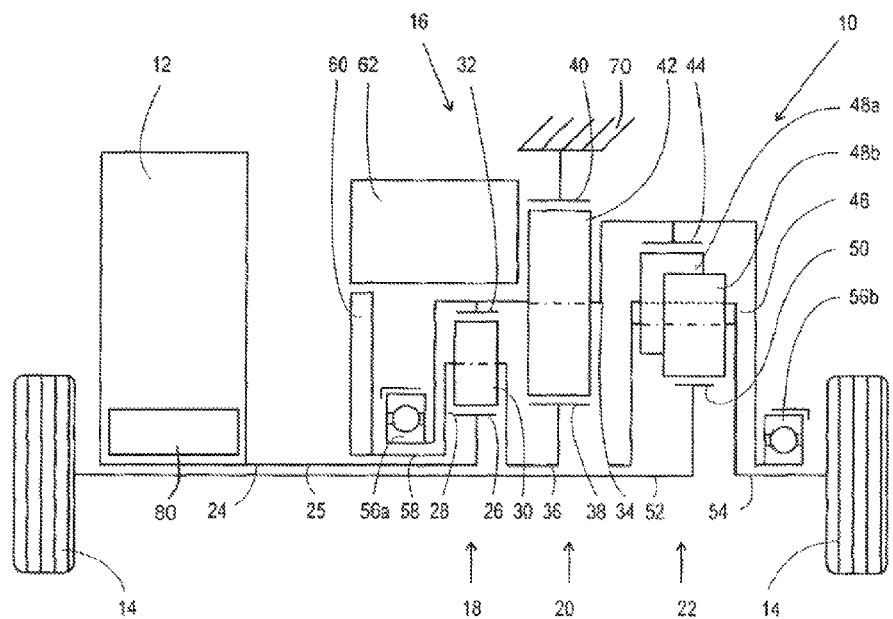
FIG. 1 is a schematic view of a first embodiment of a drive unit of a motor vehicle with a motor and gearing unit according to the invention.
Figure 2:
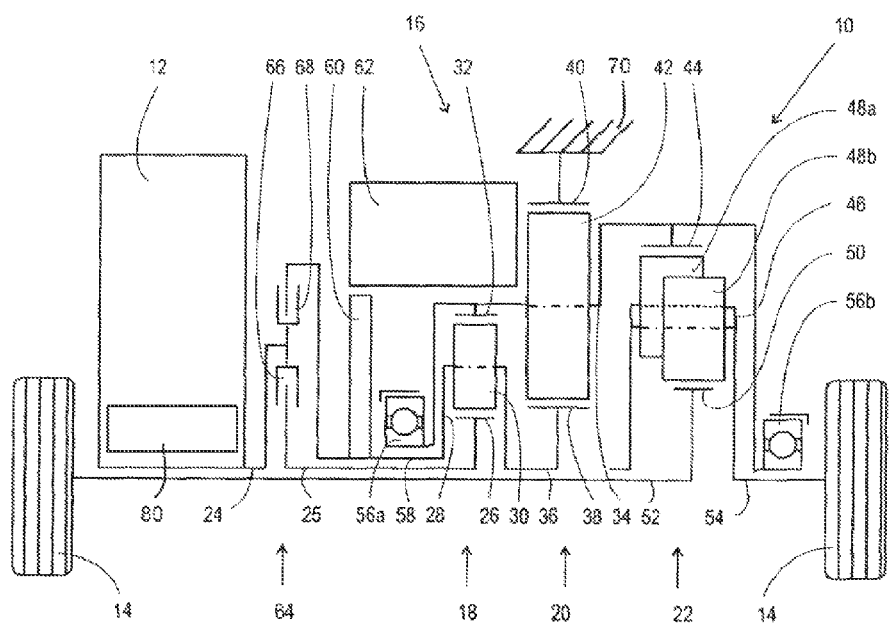
FIG. 2 is a schematic view of a development of the drive unit of FIG. 1 in accordance with the invention.

Referring now to the figures of the drawings, FIGS. 1 and 2 show different embodiments of a drive unit 10 of a motor vehicle, wherein like reference characters indicate like elements in the figures. The illustrated drive unit is used to transmit a torque generated by an electric motor 12 to power take-off wheels 14 of a driven axle. In the schematic representation of FIGS. 1 and 2, the electric motor 12 and the gearing 16 connected to the electric motor 12 are shown in a customary half-representation. In particular, only the "upper" half of the rotationally symmetric device is shown in the figures. In the following, first FIG. 1 is explained in detail and subsequently, in connection with FIG. 2, only the differences to the embodiment of FIG. 1 are explained.

The gearing 16, which serves for transferring the torque from the electric motor 12 to the power take-off wheels 14, is essentially composed of three functional groups. These are an input stage 18, a load stage 20, and a differential stage 22, which is also referred to herein as a differential. The individual stages 18, 20, 22 are adjacent in the order listed and compactly arranged next to each other.

An output shaft 24 of the electric motor 12 is disposed concentrically to the windings 80 of the electric motor 12 and is formed as a hollow shaft. Adjoining thereto is the input shaft 25 of the gearing 16 that is also embodied as a hollow shaft 25. It is connected to the sun gear 26 of the input stage 18 which is configured as a complete planetary stage with a simple planet set. The input stage 18 further includes a carrier 28 on which a simple set of planet gears 30 is rotatably mounted. The input stage 18 furthermore includes a ring gear 32. The planets 30 mesh on the one hand with the sun gear 26 and on the other hand with the ring gear 32.

The input stage 18 is connected, via two shafts, to the load stage 20, namely by means of the shaft of the ring gear 32 to the carrier 34 of the load stage 20 and by means of the first coupling shaft 36, which is embodied as a hollow shaft, to the sun gear 38 of the load stage, wherein the first coupling shaft 36 is connected to the carrier 28 of the input stage. The ring gear 40 of the load stage 20 is held fixed at the gearing housing 70 which is only schematically indicated, wherein the load stage 20 is configured as a complete planetary stage with a simple planet set. The simple set of planet gears 42 meshes on the one hand with the sun gear 38 and on the other hand with the ring gear 40.

The input stage 18 and the load stage 20 together form the transmission section of the gearing 16, which transmission section allows, in case of a suitable layout, an overall gear ratio between $i_{total}=8$ to $i_{total}=12$. Specific exemplary embodiments are given below.

The carrier 34 of the load stage 20 serves as the output element of the transmission section. The transmission section is connected to the differential stage 22 via this carrier 34, wherein the differential stage is configured as a spur gear differential with a positive stationary gear ratio of $i_0=+2$. In such a spur gear differential, the ring gear 44 of the spur gear differential acts as an input element. A carrier 46 carries a double set of planet gears 48a, 48b which mesh with one another. Additionally, the first subset of planet gears 48a meshes with the ring gear 44 and the second subset of planet gears 48b meshes with the sun gear 50 of the differential 22. The carrier 46 on the one hand and the sun gear 50 on the other hand serve as output elements of the differential 22.

In the embodiment shown, the sun gear 50 is connected to a first gearing output shaft 52 which runs centrally and which extends concentrically through the hollow shafts of the first coupling shaft 36, the gearing input shaft 25, and the motor output shaft 24. The carrier 46 of the differential 22 is connected to a second gearing output shaft 54 which extends coaxially with, but opposite to the first gearing output shaft 52.

A particular advantage of the illustrated construction is that a shaft, which is designated as the second coupling shaft and which carries the ring gear 32 of the input stage, the carrier 34 of the load stage and the ring gear 44 of the differential, extends through the entire gearing. Thus, a support for this second coupling shaft does not have to be provided within the functional gearing structure, but can be moved to the outside. Respective bearings 56a, 56b are therefore disposed on both sides outside the entirety of the transmission section and the differential.

In the embodiment shown in FIG. 1, an additional functional element is implemented, namely a parking lock. The difficulty of the integration of a parking lock is in particular due to its installation space requirements. In the embodiment shown in FIG. 1, a point of application (contact point) for the parking lock is passed to the outside of the functional and compactly built gearing unit by using an extension shaft 58 which is connected to the carrier 28 of input stage 18; in particular, the extension shaft 58 extends beyond the input-side coupling shaft bearing 56a. The extension shaft 58 carries a large spur gear 60 into which an actuating plate of a parking lock device 62 can engage. If the parking lock spur gear 60 is blocked by the parking lock device 62, then also the sun gear 38 of the load stage 20 is blocked via the carrier 28 of the input stage 18. Thus, two of the three elements of the load stage 20, namely its sun gear 38 and its ring gear 40, which is fixed relative to the housing, are blocked so that the entire load stage 20 and thus the entire gearing 16 is blocked. The load is in this case solely present in the load stage which is constructed in a correspondingly robust manner.

As an exemplary layout for a device according to FIG. 1, the following values have been proven effective: Stationary gear ratio of the input stage 18 $i_{01}=-2.09$, stationary gear ratio of the load stage 20 $i_{02}=-2.72$, stationary gear ratio of the spur gear differential $i_{03}=+2.0$. This layout results in an overall gear ratio of the device of $i_{total}=9.4$.

FIG. 2 shows a development of the drive of FIG. 1 in the form of a shiftable two-speed gearing. To this end, the system of FIG. 1 is augmented by a clutch device 64, which is positioned on the input side of the gearing 16. In this embodiment, the input shaft 25 of the gearing 16 is not fixedly connected to the output shaft 24 of the electric motor 12, but is coupled via a first clutch 66 of the clutch device 64. By means of a second clutch 68 of the clutch device 64, which is configured as a dual-clutch, the extension shaft 58, which extends beyond the parking lock spur gear 60, can also, in particular in alternative to the input shaft 25, be coupled to the motor output shaft 24.

The person of skill in the art recognizes three expedient shift states of the dual clutch 64 whose transitions are controllable by a suitable clutch management. In a first shift state, the first clutch 66 is closed and the second clutch 68 opened. In this state, the functionality of the gearing 16 of FIG. 2 does not differ from that of the gearing 16 of FIG. 1. A repetition of the explanation is therefore omitted. In a second clutch position, the second clutch 68 is closed and the first clutch 66 is opened. The torque of the motor output shaft 24 is thus transmitted, via the extension shaft 58, to the carrier 28 of the input stage 18, which carrier rotates freely however because the input shaft 25, which is connected to the sun gear 26, rotates freely. In other words, the input stage 18 is "skipped". The load stage 20 with its sun gear 38, via which the torque is introduced, and with its ring gear 40, which is fixed relative to the housing, serves as a simple transmission stage so that its stationary gear ratio determines the overall gear ratio of the drive. In a third clutch position, both clutches 66, 68 of the dual clutch 64 are open. The electric motor 12 is thus completely decoupled from the gearing.

As an exemplary layout the following values have been proven effective: Stationary gear ratio of the input stage 18 $i_{01}=-2.09$, stationary gear ratio of the load stage 20 $i_{02}=-2.97$, stationary gear ratio of the spur gear differential 22 $i_{03}=+2.0$. In the first clutch position, which is referred to as "first gear," with a dosed first clutch 66 and an open second clutch 68 thus an overall gear ratio of $i_{total}=10.18$ is implemented at a moderate relative rotational speed in the open second clutch 68 of approximately 60% of the input rotational speed. In the second clutch position, which is referred to as "second gear," with a closed second clutch 68 and an open first clutch 66, an overall gear ratio of $i_{total}=3.97$ is implemented at a likewise still moderate relative rotational speed at the open first clutch 66 of about 150% of the input rotational speed.

The embodiments discussed in the detailed description and shown in the drawings are of course only illustrative exemplary embodiments of the present invention. A person of skill in the art is given a wide range of possibilities for variations in light of the disclosure provided herein. In particular, the special layout of the stationary gear ratio of the individual gearing stages can be adapted to the circumstances of the individual case which are in particular affected by the performance of the electric motor 12.

LIST OF REFERENCE CHARACTERS 10 drive unit
12 electric motor 14 power take-off wheels
16 gearing
18 input stage
20 load stage
22 differential stage
24 motor output shaft
25 gearing input shaft
26 sun gear of 18
28 carrier of 18
30 planet gear of 18
32 ring gear of 18
34 carrier of 20
36 first coupling shaft
38 sun gear of 20
40 ring gear of 20
42 planet gear of 20
44 ring gear of 22
46 carrier of 22
48a, 48b planet gears of 22
50 sun gear of 22
52 first gearing output shaft
54 second gearing output shaft
56a, 56b coupling shaft bearing
58 extension shaft
60 parking lock spur gear
62 parking lock device
64 clutch device
66 first clutch of 64
68 second clutch of 64
70 housing
80 windings of 12

What is claimed is:

1. A transmission and differential gearing comprising:
a housing;
an input shaft;
two output shafts disposed coaxially to said input shaft;
a transmission section having two planetary stages, namely an input stage and a load stage, said input stage having a carrier, a ring gear and a sun gear, said sun gear of said input stage being connected or coupleable to said input shaft, said load stage having a carrier, a ring gear and a sun gear, said ring gear of said load stage being fixed relative to said housing, said sun gear of said load stage being connected to said carrier of said input stage, said carrier of said load stage being connected to said ring gear of said input stage;
a differential section configured as a spur gear differential, said spur gear differential being configured as a planetary gear set having a positive stationary gear ratio and having a carrier, a ring gear and a sun gear, said ring gear of said planetary gear set being connected to said carrier of said load stage, said carrier of said planetary gear set and said sun gear of said planetary gear set being connected to a respective one of said two output shafts; and
a through-going coupling shaft mounted on both sides of an entirety of said transmission section and said differential section at said housing, said through-going coupling shaft carrying said ring gear of said input stage, said carrier of said load stage and said ring gear of said spur gear differential.

2. The transmission and differential gearing according to clam 1, wherein:
said input shaft is configured as a hollow shaft; and
one of said two output shafts extends coaxially through said input shaft.

3. The transmission and differential gearing according to clam 1, wherein:
said through-going coupling shaft has a bearing on a side of said input stage;
an extension shaft extends beyond said bearing; and
said carrier of said input stage is connected to said extension shaft.

4. The transmission and differential gearing according to claim 3, including:
a parking lock device disposed in said housing;
a parking lock spur gear disposed at a portion of said extension shaft, said portion of said extension shaft extending beyond said bearing of said through-going coupling shaft; and
said parking lock spur gear being in engagement with said parking lock device.

5. The transmission and differential gearing according to claim 1, including a clutch device, said clutch device coupling, in a first clutch position, said sun gear of said input stage to said input shaft, said clutch device coupling, in a second clutch position, said carrier of said input stage to said input shaft and said clutch device, in a third clutch position, completely decoupling said input stage.

6. The transmission and differential gearing according to claim 3, including:
a clutch device, said clutch device coupling, in a first clutch position, said sun gear of said input stage to said input shaft, said clutch device coupling, in a second clutch position, said carrier of said input stage to said input shaft and said clutch device, in a third clutch position, completely decoupling said input stage; and
said clutch device engaging at a portion of said extension shaft, said portion of said extension shaft extending beyond said bearing of said through-going coupling shaft.

7. The transmission and differential gearing according to claim 4, including:
a clutch device, said clutch device coupling, in a first clutch position, said sun gear of said input stage to said input shaft, said clutch device coupling, in a second clutch position, said carrier of said input stage to said input shaft and said clutch device, in a third clutch position, completely decoupling said input stage; and
said clutch device engaging at a portion of said extension shaft, said portion of said extension shaft extending beyond said bearing of said through-going coupling shaft such that said clutch device contacts at a part of said portion of said extension shaft extending beyond said bearing that faces away from said bearing of said coupling shaft.

8. A motor and gearing unit comprising:
an electric motor having windings and a motor output shaft;
a transmission and differential gearing including a housing, an input shaft, two output shafts disposed coaxially to said input shaft, a transmission section and a differential section;
said transmission section having two planetary stages, namely an input stage and a load stage, said input stage having a carrier, a ring gear and a sun gear, said sun gear of said input stage being connected or coupleable to said input shaft, said load stage having a carrier, a ring gear and a sun gear, said ring gear of said load stage being fixed relative to said housing, said sun gear of said load stage being connected to said carrier of said input stage, said carrier of said load stage being connected to said ring gear of said input stage;
said differential section being configured as a spur gear differential, said spur gear differential being configured as a planetary gear set having a positive stationary gear ratio and having a carrier, a ring gear and a sun gear, said ring gear of said planetary gear set being connected to said carrier of said load stage, said carrier of said planetary gear set and said sun gear of said planetary gear set being connected to a respective one of said two output shafts;

said transmission and differential gearing being flange-mounted coaxial to said electric motor, said motor output shaft being disposed coaxial to said windings of said electric motor, said motor output shaft being connected to said input shaft of said transmission and differential gearing, said motor output shaft being configured as a hollow shaft and being traversed coaxially by one of said two output shafts of said transmission and differential gearing; and a clutch device, said clutch device coupling, in a first clutch position, said sun gear of said input stage to said input shaft, said clutch device coupling, in a second clutch position, said carrier of said input stage to said input shaft and said clutch device, in a third clutch position, completely decoupling said input stage.

9. The motor and gearing unit according to claim 8, wherein:
said input shaft is configured as a hollow shaft; and
one of said two output shafts extends coaxially through said input shaft.

10. The motor and gearing unit according to claim 8, including a through-going coupling shaft mounted on both sides of an entirety of said transmission section and said differential section at said housing, said through-going coupling shaft carrying said ring gear of said input stage, said carrier of said load stage and said ring gear of said spur gear differential.

11. The motor and gearing unit according to claim 10, wherein:
said through-going coupling shaft has a bearing on a side of said input stage;
an extension shaft extends beyond said bearing; and
said carrier of said input stage is connected to said extension shaft.

12. The motor and gearing unit according to claim 8, including:
a parking lock device disposed in said housing;
a parking lock spur gear in engagement with said parking lock device; and
said carrier of said input stage being connected to said parking lock spur gear.

13. The motor and gearing unit according to claim 11, including:
a parking lock device disposed in said housing;
a parking lock spur gear disposed at a portion of said extension shaft, said portion of said extension shaft extending beyond said bearing of said through-going coupling shaft; and
said parking lock spur gear being in engagement with said parking lock device.

14. The motor and gearing unit according to claim 11, wherein said clutch device engages at a portion of said extension shaft, said portion of said extension shaft extends beyond said bearing of said through-going coupling shaft.

15. The motor and gearing unit according to claim 13, wherein said clutch device engages at a portion of said extension shaft, said portion of said extension shaft extends beyond said bearing of said through-going coupling shaft such that said clutch device contacts at a part of said portion of said extension shaft extending beyond said bearing that faces away from said bearing of said coupling shaft.

16. A transmission and differential gearing comprising:
a housing;
an input shaft;
two output shafts disposed coaxially to said input shaft;
a transmission section having two planetary stages, namely an input stage and a load stage, said input stage having a carrier, a ring gear and a sun gear, said sun gear of said input stage being connected or coupleable to said input shaft, said load stage having a carrier, a ring gear and a sun gear, said ring gear of said load stage being fixed relative to said housing, said sun gear of said load stage being connected to said carrier of said input stage, said carrier of said load stage being connected to said ring gear of said input stage;
a differential section configured as a spur gear differential, said spur gear differential being configured as a planetary gear set having a positive stationary gear ratio and having a carrier, a ring gear and a sun gear, said ring gear of said planetary gear set being connected to said carrier of said load stage, said carrier of said planetary gear set and said sun gear of said planetary gear set being connected to a respective one of said two output shafts;
a parking lock device disposed in said housing;
a parking lock spur gear in engagement with said parking lock device; and
said carrier of said input stage being connected to said parking lock spur gear.

* * * * *